United States Patent

Büngeler et al.

[11] Patent Number: 5,826,687
[45] Date of Patent: Oct. 27, 1998

[54] ANTI-ROLL VEHICULAR SUSPENSION SYSTEM AND A HYDRAULIC ROTARY ACTUATOR SYSTEM IN AN ANTI-ROLL VEHICULAR SUSPENSION SYSTEM

[75] Inventors: Jörg Büngeler, Rheinberg; Manfred Berwind, Gadheim-Ottendorf; Thomas Göppner, Salz; Thomas John, Alitzheim; Horst Oppitz, Dittelbrunn; Bernhard Schmitt, Wasserlosen; Ulrich Walz, Wipfeld, all of Germany

[73] Assignee: Fichtel & Sachs AG, Schweinfurt, Germany

[21] Appl. No.: 360,434

[22] Filed: Dec. 21, 1994

[30] Foreign Application Priority Data

Dec. 21, 1993 [DE] Germany .......................... 43 43 580.7

[51] Int. Cl.[6] .................................................. B60G 21/05
[52] U.S. Cl. .......................... 188/296; 188/307; 280/689
[58] Field of Search .............................. 280/689; 188/290, 188/296, 306, 307, 308, 309, 310

[56] References Cited

U.S. PATENT DOCUMENTS 3,197,233  7/1965  Van Winsen et al. .
5,178,406  1/1993  Reynolds ................................. 280/723
5,267,504  12/1993  Weyer ........................................ 92/31
5,286,059  2/1994  Tabe ......................................... 280/840
5,288,101  2/1994  Minnett ................................... 280/689
5,290,048  3/1994  Takahashi et al. ..................... 280/6.12
5,309,816  5/1994  Weyer ........................................ 92/32
5,332,236  7/1994  Kastuhara et al. ...................... 277/165

FOREIGN PATENT DOCUMENTS

1175093  1/1965  Germany .

Primary Examiner—Matthew C. Graham
Attorney, Agent, or Firm—Nils H. Ljungman and Associates

[57] ABSTRACT

System for the control of the roll of a motor vehicle, the system including a number of valves and lines for the feed and control of an actuator. The actuator is coupled to a stabilizer by means of connections, whereby the lines and connections have a one-to-one correspondence, in that the coupling points which are relevant for operation are all realized so that they can only be connected in the correct pairings.

8 Claims, 5 Drawing Sheets

ANTI-ROLL VEHICULAR SUSPENSION SYSTEM AND A HYDRAULIC ROTARY ACTUATOR SYSTEM IN AN ANTI-ROLL VEHICULAR SUSPENSION SYSTEM

BACKGROUND OF THE INVENTION

1. Field of the Invention

The present invention generally relates to a system for the control of the roll of a motor vehicle, which system can comprise a number of valves and lines to supply and control an actuator, which actuator can be coupled by means of connections to a stabilizer, 2. Background Information German Patent Application No. 1 175 093 discloses a system which tilts the body of a motor vehicle when the vehicle is cornering, in which a split stabilizer can be braced by means of a hydraulic rotary actuator to minimize the lateral inclination of a motor vehicle. The complexity of the overall system leaves open the possibility that errors can occur during assembly and installation, which can cause the rotary actuator to malfunction, or which can result in a defective base position of the stabilizer parts. These defects can be such that the assembler on the assembly line is unable to recognize errors and defects, so that the malfunction is noted first by the customer, at which point an increased amount of time, effort and expense is typically required to repair the unit.

OBJECT OF THE INVENTION

The object of the present invention is to design a stabilizer system with a rotary actuator so that in spits of the large number of components and the connections between the stabilizer and the rotary actuator, there is a manufacturing process which can essentially always guarantee a system which is fully functional and operates correctly.

SUMMARY OF THE INVENTION

The present invention teaches that this object can be accomplished if the lines and connections, preferably between the stabilizer and the rotary actuator, preferably have a one-to-one correspondence in which the couplings, which couplings are relevant for the functioning of the system, can essentially only be connected in the proper manner. For the installer, this configuration of the couplings can result in a major reduction in the complexity of the operation, because an incorrect installation or assembly can typically be recognized immediately.

In particular, when repairs are being made to the vehicle, at which point work on the system can typically become much more complex because of the presence of the surrounding systems and equipment, this type of coupling can be particularly effective in simplifying operations and preventing errors.

For example, the connections of the lines can preferably always have a unique connection diameter with regard to one coupling point. The present invention advantageously takes into consideration the fact that a similar method can also be used for the connections between the valves. In addition, markings can also preferably be applied to the connections to facilitate the correspondence between the coupling points.

In particular, when an actuator is in the form of a rotary actuator, it can be very advantageous if the connections between the stabilizer and the actuator have a connecting profile which is preferably coordinated with the installation position of the stabilizer in relation to the actuator. In known rotary actuators, a spline or multi-spline profile is frequently used, in which an assembly which is out of place by a single tooth may not be noticed until essentially the entire stabilizer system has been installed in the vehicle. This source of errors can preferably be eliminated by the connection profile in accordance with the present invention, which connection profile can preferably be designed so that it can essentially only be installed in the correct position.

In accordance with one embodiment of the present invention, the connection profile used can preferably be a spline profile realized in relation to an arbitrary axis of symmetry. The connection profile can also alternatively be configured so that it can preferably have a polygon profile. Alternatively, the connection between the stabilizer and the actuator can preferably be designed as a socket or flange, whereby the pattern of holes in the socket can have an essentially asymmetrical distribution. The asymmetrical distribution can preferably be achieved by several reference circles or socket holes, but it can also be achieved by an unequal angular pitch. For a stabilizer which has unequal torsional length segments, e.g. to correctly position the actuator, the present invention teaches that it can be advantageous to have different patterns of holes between the stabilizer parts, at least with respect to the overall configuration.

The above discussed embodiments of the present invention will be described further hereinbelow with reference to the accompanying figures. When the word "invention" is used in this specification, the word "invention"includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained below in greater detail with reference to the embodiments illustrated in the accompanying figures, in which.

DESCRIPTION OF THE PREFERRED EMBODIMENT

Figure 1:
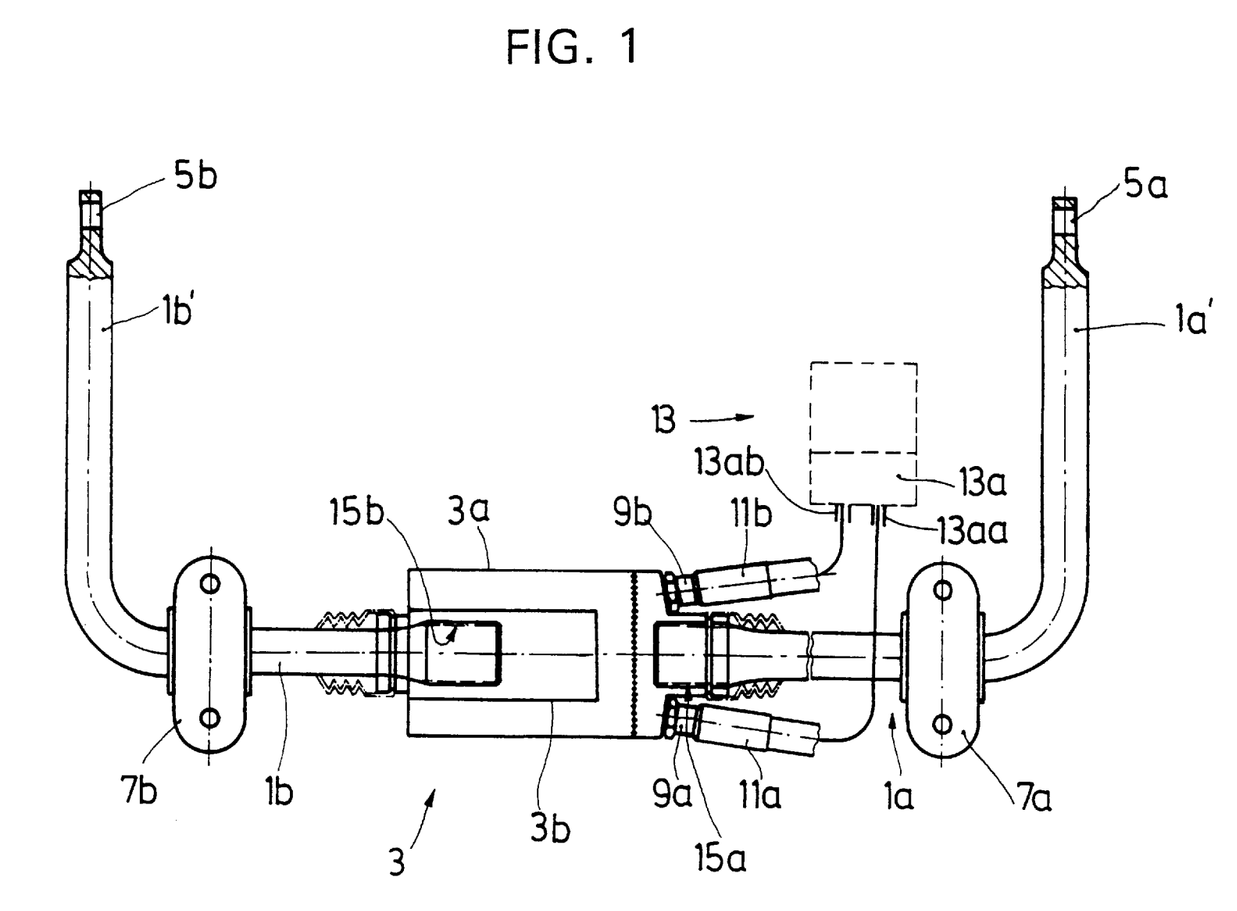
FIG. 1 shows a stabilizer system with an actuator.

FIG. 1 shows a stabilizer 1a, 1b with an actuator 3 which can preferably be realized in the form of a rotary actuator. On the ends 1a', 1b' of the stabilizer 1a, 1b, which ends 1a', 1b' can preferably be bent at right angles with respect to the stabilizer 1a, 1b, there can be locators 5a, 5b. Wheel bearings of a motor vehicle, which wheel bearings are not shown in the drawing for reasons of simplicity, can preferably be engaged in the locators 5a, 5b. Articulated clips 7a, 7b can preferably be provided to fasten the stabilizer 1a, 1b in the vehicle.

The rotary actuator 3 can preferably include a rotary actuator housing 3a and a rotary actuator vane component 3b, whereby the rotary actuator housing 3a can preferably be non-rotationally connected to the stabilizer part 1a, and the rotary actuator vane component 3b can preferably be non-rotationally connected to the stabilizer part 1b. In the event of an uneven spring deflection of the vehicle, the rotary actuator 3 can preferably rotate by means of the angled ends 1a', 1b', whereby wheel contact forces, in connection with the angled ends, can preferably exert a torsion moment on the stabilizer 1a, 1b.

The rotary actuator 3 can preferably have two hydraulic connections 9a, 9b which, by means of hydraulic lines 11a, 11b, can create a link to a hydraulic system 13, whereby the hydraulic system 13 preferably has, among other things, at least one hydraulic control system 13a. In accordance with one preferred embodiment of the present invention, the control system 13a can preferably be in the form of a valve. The actuator 3 could also be a double-acting hydraulic cylinder, which hydraulic cylinder would preferably be installed essentially identically, in the analogous sense.

On the hydraulic lines 11a, 11b, the diameters of the connections 9a, 9b can preferably be designed so that line 11b cannot be coupled to connection 9a, and line 11a cannot be coupled to connection 9b. For example, and in accordance with one embodiment of the present invention, line 11a can preferably have a diameter which essentially corresponds to the diameter of connection 9a. Likewise, line 11b can preferably have a diameter which essentially corresponds to the diameter of connection 9b. For this special type of installation, the hydraulic lines 11a, 11b can also be of different lengths, so that it can be essentially impossible for the lines 11a, 11b to be connected to the wrong connection. The same can preferably be true for hydraulic connections 13aa, 13ab between the lines 11a and 11b respectively and the hydraulic system 13, where incorrect connections can be made essentially impossible by the diameters of the lines 11a, 11b and the connections 13aa, 13ab, and by the lengths of the lines 11a, 11b. (It should be noted that the hydraulic system 13 and the hydraulic connections 13aa and 13ab are shown schematically only in FIG. 1.)

Thus, in accordance with at least one embodiment of the present invention, line 11a can preferably have a diameter which corresponds to the diameter of connection 13aa. Likewise, line 11b can preferably have a diameter which corresponds to the diameter of connection 13ab, Further, connections 9a and 13aa can preferably have similar diameters, and connections 9b and 13ab can preferably have similar diameters.

Figure 2A:
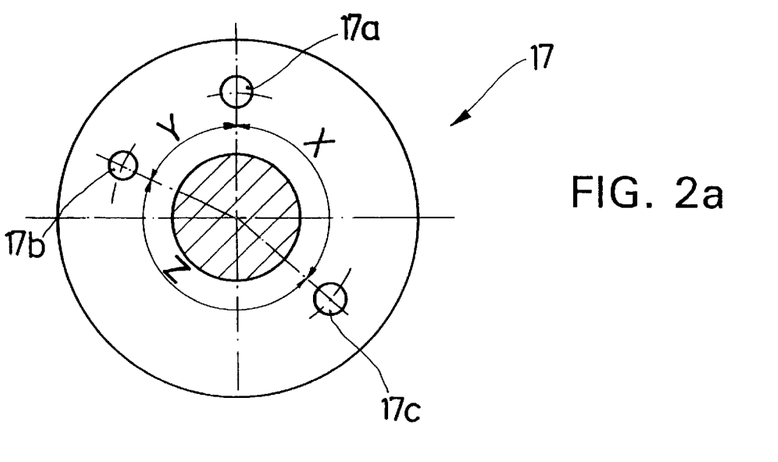
FIGS. 2a–2d show embodiments of the coupling points between the actuator and the stabilizer parts.

With regard to the coupling points 15a and 15b between the actuator 3 and the stabilizer 1a, 1b, respectively, FIG. 2a illustrates the possibility that a socket or flange 17 for the socket holes or flange holes 17a, 17b, 17c can preferably have an unequal angular pitch X, Y, Z, whereby one hole 17a can preferably be aligned with the actuator 3, to clearly define the position of the angled ends 1a', 1b', of the stabilizer 1a, 1b. Of course, the number of holes actually used can be greater than the number of holes in the figure.

Figure 3A:
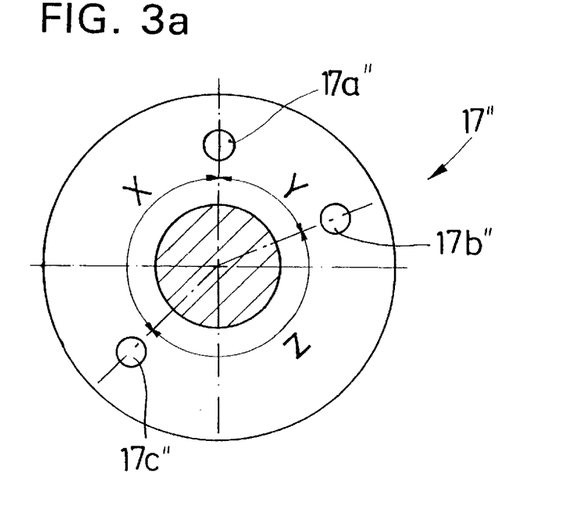
FIGS. 3a, 3b, 3c, 3d, 3e, 3f and 3g show additional embodiments of the coupling points between the actuator and the stabilizer parts.
Figure 3B:
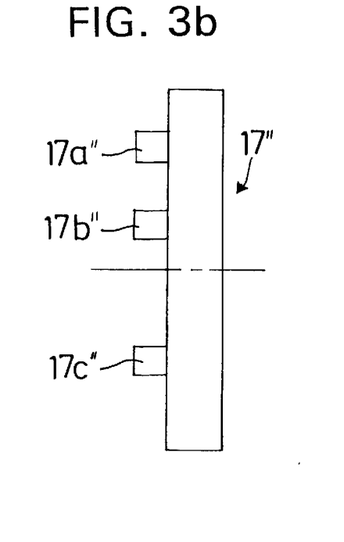

In accordance with one embodiment of the present invention, the coupling points 15a and 15b, preferably between the actuator 3 and the stabilizer 1a, 1b, can preferably be designed in the form of a socket connection, such as a male-female socket connection, in which one of the actuator 3 or the stabilizer 1a, 1b can preferably be configured as shown in FIG. 2a with socket holes 17a, 17b and 17c. The other of the actuator 3 and the stabilizer 1a, 1b can then preferably have a pronged profile 17", which profile 17" can have three prongs 17a", 17b", and 17c", as shown in FIGS. 3a and 3b. FIG. 3b shows a side view of the pronged profile 17". The three prongs 17a", 17b" and 17c" can preferably have the same angular orientation X, Y, Z with respect to one another as the socket holes 17a, 17b, and 17c. The part (i.e. the actuator 3 or the stabilizer 1a, 1b) which has the prongs 17a", 17b" and 17c" can then preferably be adjusted or turned until the prongs 17a", 17b" and 17c" are in alignment with the socket holes 17a, 17b and 17c, and the prongs 17a", 17b", and 17c" can then be inserted into the holes 17a, 17b, and 17c. As stated above, the number of holes 17a, 17b, 17c can be varied, and of course, the number of prongs 17a", 17b", and 17c" can therefore vary in accordance with the number of holes 17a, 17b, and 17c present. It should be noted, however, that at least three holes could preferably be used, as a lesser number conceivably may not result in an effective torque transmission. Further, the socket connections can preferably be realized differently on the two stabilizer parts 1a and 1b, such that there is essentially only one way to assemble the system, i.e. the correct way. In other words, and in accordance with one embodiment of the present invention, the socket connections can preferably be realized differently, either in size or in configuration, on the two stabilizer parts 1a, 1b, so that stabilizer part 1a can essentially only be connected at coupling point 15a, and stabilizer part 1b can essentially only be connected at coupling point 15b.

Figure 2B:
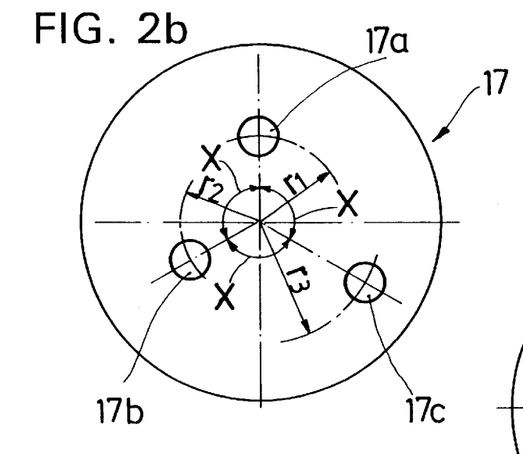

Alternatively, as illustrated in FIG. 2b, there can also be several reference circles preferably having unequal radii r1, r2, and r3. Of course, FIGS. 2a and 2b can also be combined. For example, the holes 17a, 17b, and 17c can preferably be disposed at unequal angles with respect to one another as shown in FIG. 2a, and, in addition, the holes 17a, 17b and 17c can also have unequal radii r1, r2 and r3. To position the actuator 3 in the specified position with respect to the stabilizer parts 1a, 1b, with an asymmetrical stabilizer division, the sockets or flanges 17 on the two stabilizer parts 1a, 1b can preferably be realized differently, either in size or configuration, so that there is essentially only one possible way in which the system can be assembled and installed. In accordance with one embodiment of the present invention, as discussed above with regard to FIG. 2a, one of the actuator 3 and the stabilizer 1a, 1b can preferably have the configuration shown in FIG. 2b, and the other of the actuator 3 and the stabilizer 1a, 1b can preferably have three prongs which are preferably positioned to correspond with the holes 17a, 17b and 17c, similar to that described with reference to FIGS. 3a and 3b.

Figure 2C:
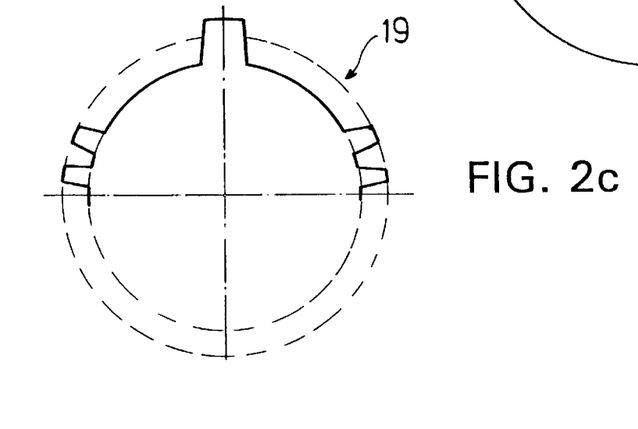
Figure 3C:
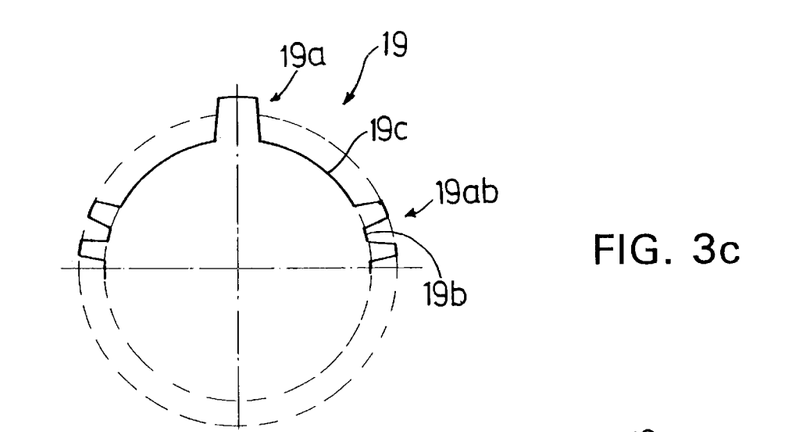

FIG. 2c shows an additional embodiment of the present invention in which a spline connection 19 can preferably be used as coupling points 15a, 15b. To guarantee a correctly-oriented and one-to-one assembly and installation, the profile can preferably be asymmetrical, at least with respect to a single given axis of symmetry. In the illustrated embodiment, the spline profile 19 can preferably have a groove, which groove can be different from a groove of another profile, so that with a corresponding matching profile, essentially only one installation position is possible. FIG. 3c shows an additional embodiment of the present invention wherein the spline profile 19 can preferably have two different spline configurations 19a and 19ab. The spline configuration 19ab can preferably have a groove 19b which groove 19b can be different, or in this case smaller, than a groove 19c of profile 19a. Of course, profiles 19a and 19ab can alternatively be termed "teeth".

Figure 3D:
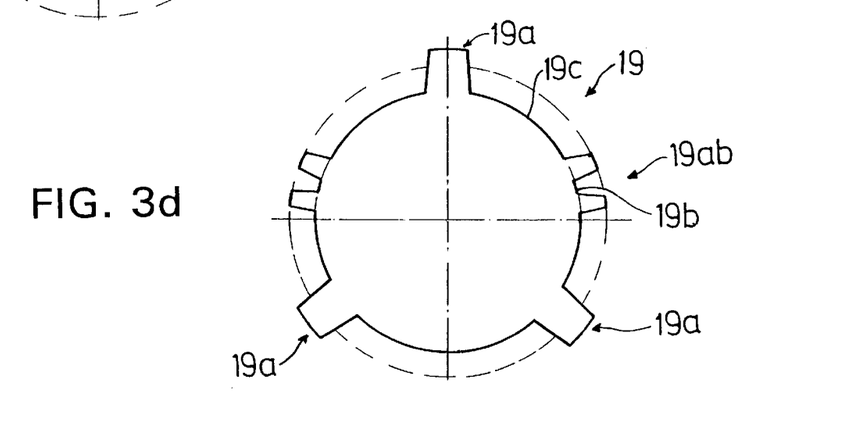

FIG. 3c and 3d, an additional embodiment of the present invention in which there can preferably be three profiles 19a and two profiles 19ab.

Figure 3E:
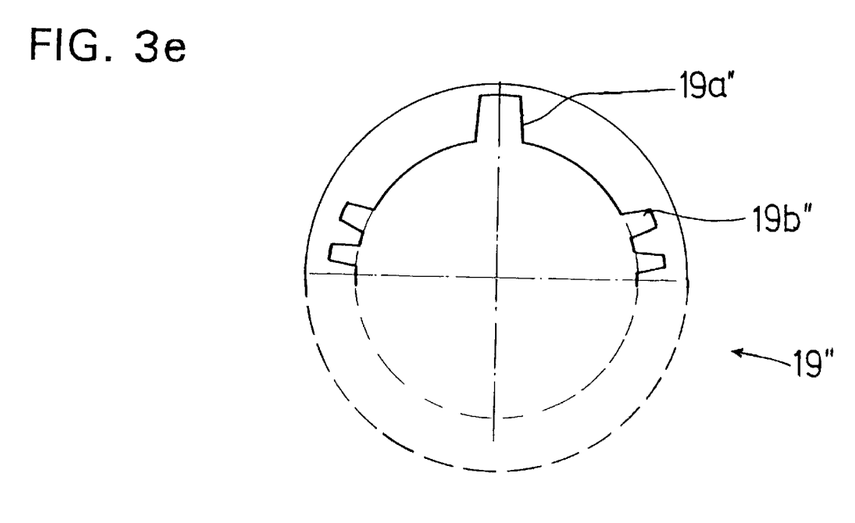

As discussed above with regard to the embodiment shown in FIG. 2a, and in accordance with one embodiment of the present invention, one of the actuator 3 and the stabilizer 1a, 1b can preferably be configured as shown in FIGS. 2c, 3c and 3d and the other one of the actuator 3 and the stabilizer 1a, 1b can have a corresponding asymmetrical spline configuration. Such a configuration is shown, for example, in FIG. 3e. One part (i.e. the stabilizer 1a, 1b or the actuator 3) can preferably have a spline configuration 19" which can preferably correspond to the spline configuration 19 shown in FIG. 3c. Spline configuration 19" can preferably have at least one space 19a" for engaging with profile 19a of FIG. 3c, and can also have additional spaces 19b" for engaging with profile 19ab of FIG. 3c.

Figure 2D:
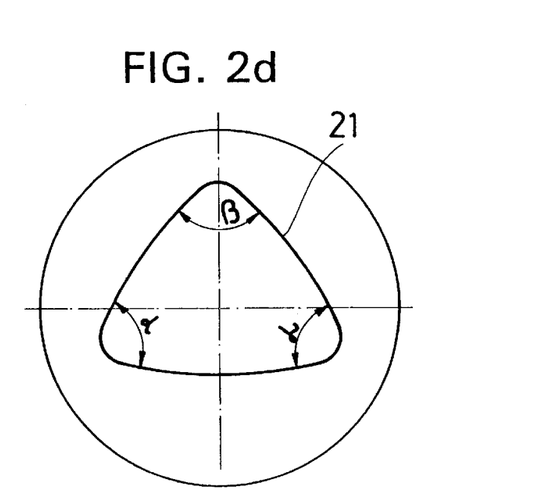

Given the appropriate manufacturing capabilities, as in the embodiment illustrated in FIG. 2d, a polygon profile 21 can preferably also be used as the coupling point 15a, 15b between the stabilizer 1a, 1b and the actuator 3. The one-to-one correspondence described with respect to the socket or flange connection between the two stabilizer parts 1a, 1b can naturally also be realized on the spline or polygon profiles 19, 21, respectively. In other words, and in accordance with one embodiment of the present invention, the polygonal profile 21 on the two stabilizer parts 1a, 1b can preferably be realized differently so that the stabilizer part 1a can be connected to the actuator 3 essentially only through connection 15a, and that stabilizer part 1b can be connected to the actuator 3 essentially only through connection 15b.

Further, the embodiment shown in FIG. 2d can preferably have three angled portions, wherein two of these three angled portions can preferably have angles (alpha), and the other angled portion can preferably have an angle (beta). The angle (beta) can preferably be slightly larger in value than the two angles (alpha). Of course, other configurations and angular values, including three different angular values, would be within the scope of the present invention assuming that the resulting configuration is asymmetrical.

Figure 3F:
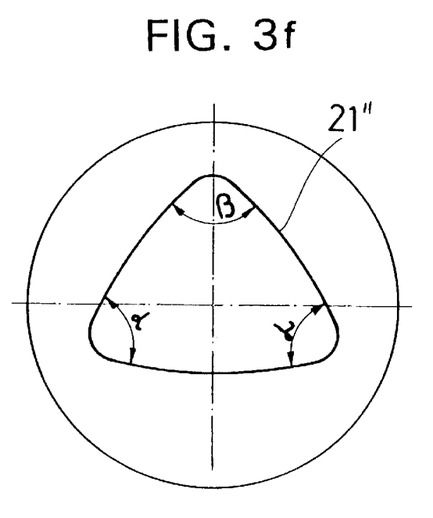
Figure 3G:
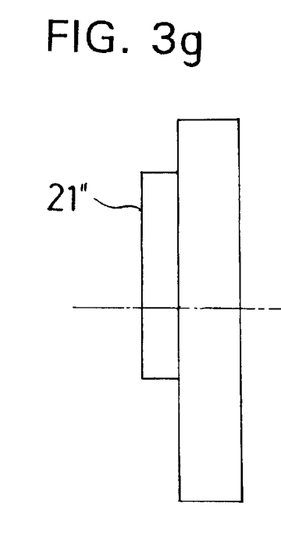

As stated above, and in accordance with one embodiment of the present invention, one of the actuator 3 and the stabilizer 1a, 1b can preferably have a polygonal profile 21 such as that shown in FIG. 2d, while the other of the actuator 3 or the stabilizer 1a, 1b can have a corresponding polygonal profile 21" as shown in FIGS. 3f and 3g, which would preferably result in a male-female type of connection. Thus, the polygonal profile 21" shown in FIGS. 3f and 3e' can preferably be embodied by a projection, which projection can preferably be inserted into the corresponding polygonal profile 21 of FIG. 2d. FIG. 3g shows a side view of the polygonal profile 21". Further, as also stated above, the stabilizer parts 1a, 1b can preferably have differing configurations so that they can essentially not be installed in the incorrect positions with respect to the actuator 3.

Figure 4:
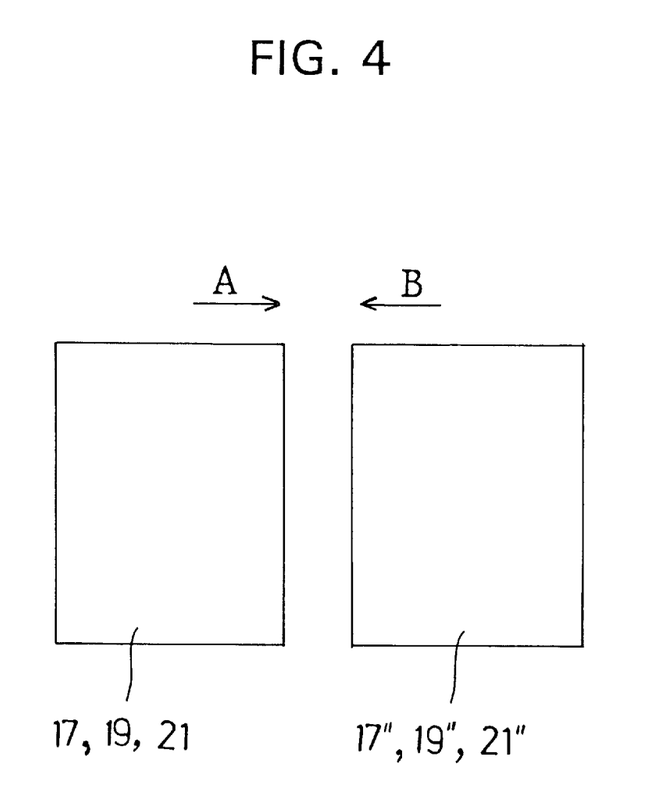
FIG. 4 shows a schematic representation of the coupling points.

In accordance with one embodiment of the present invention, FIG. 4 shows a schematic representation of the connection between female profiles 17, 19, and 21 and male profiles 17", 19" and 21". The letters A,B can preferably represent directions in which the female profiles 17, 19, 21 and the male profiles 1", 19", 21", respectively, can be moved in order to engage one with the other to form the couplings 15a and 15b.

It should be noted that with regard to all of the embodiments discussed hereinabove, that the coupling connections 15a, 15b can be different from one another, in accordance with at least one embodiment of the present invention, so as to avoid the connection of stablizer 1a to coupling connection 15b, and to avoid the connection of stabilizer 1b to coupling connection 15a. The coupling connections 15a, 15b can be different from one another in that they can, for example, both be configured such that stabilizer parts 1a, 1b both are female sockets 17, 19, 21 with different dimensions from one another, while the actuator can be configured as a male profile, 17", 19", 21" which male profile 17", 19", 21" preferably matches each corresponding female socket 17, 19, 21 of stabilizer parts 1a and 1b. Alternatively, the coupling connections 15a, 15b can be configured such that stabilizer part 1a is configured as a female socket 17, 19, 21, while the actuator 3, at connection 15a, is preferably configured as a male profile 17", 19", 21", and stabilizer part 1b is a male profile 17", 19", 21", while the actuator 3, at connection 15b is configured as a female socket 17, 19, 21.

One feature of the invention resides broadly in the system for the control of the roll of a motor vehicle, comprising a number of valves and lines for the feed and control of an actuator which is coupled to a stabilizer by means of connections, characterized by the fact that the lines 11 and connections 15 have a one-to-one correspondence, in that the coupling points 15, 9a, 9b, 13ab, 13aa which are relevant for operation are all realized so that they can only be connected in the correct pairings.

Another feature of the invention resides broadly in the system characterized by the fact that the connections 9a, 9b, 13aa 13ab of the lines 11 in relation to a coupling point each have their own unique connection diameter.

Yet another feature of the invention resides broadly in the system characterized by the fact that the connections 15 between the stabilizer 1a, 1b and the actuator 3 have a connection profile which is coordinated with the correct position of the stabilizer 1 with respect to the actuator 3, Still another feature of the invention resides broadly in the system characterized by the fact that a spline profile 19 which is realized in relation to an arbitrary axis of symmetry is used as the connection profile.

A further feature of the invention resides broadly in the system characterized by the fact that the connection 15 between the stabilizer 1 and the actuator 3 is realized as a flange 17, whereby the pattern of holes 17a, b, c in the flange 17 has an asymmetrical distribution.

A further feature of the invention resides broadly in the system characterized by the fact that the connection 15 between the stabilizer 1 and the actuator 3 is realized as a socket 17, whereby the pattern of holes 17a, b, c in the socket 17 has an asymmetrical distribution.

Another feature of the invention resides broadly in the system characterized by the fact that a polygon profile 21 is used as the connection profile.

Yet another feature of the invention resides broadly in the system characterized by the fact that the stabilizer 1 is divided asymmetrically, and the coupling points 15 between the stabilizer parts 1a, 1b differ from one another, at least with respect to their dimensional configuration.

Some types of automobile suspension systems that could be utilized in accordance with the rotary actuator motor may be or are disclosed by the following U.S. Patents: U.S. Pat. No. 5,178,406 to Reynolds, entitled "Torsion Bar Suspension"; U.S. Pat. No. 5,286,059 to Tabe, entitled "Height Control System when Vehicle Is Jacked Up"; U.S. Pat. No. 5,288,101 to Minnett, entitled "Variable Rate Torsion Control System for Vehicle Suspension"; and U.S. Pat. No. 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Patents: U.S. Pat. No. 5,332,236 to Kastuhara et al., entitled "Sealing Mechanism for a Rotary Actuator"; U.S. Pat No. 5,309,816 to Weyer, entitled "Rotary Actuator with External Bearings"; U.S. Pat. No. 5,267,504 to Weyer, entitled "Rotary Actuator with Annular Fluid Coupling Rotatably Mounted to Shaft"; and U.S. Pat. No. 5,310,021 to Hightower, entitled "Motor-driven, Spring-returned Rotary Actuator".

The invention as described hereinabove in the context of the preferred embodiments is not to be taken as limited to all of the provided details thereof, since modifications and variations thereof may be made without departing from the spirit and scope of the invention.

What is claimed is:

1. A method of assembling a vehicular suspension system, said vehicular suspension system comprising a hydraulic rotary actuator, said hydraulic rotary actuator comprising a body; said body comprising a first member and a second member; at least one of said first member and said second member being rotatable, about an axis of rotation, with respect to the other of said first member and said second member by hydraulic fluid under pressure; a first stabilizer bar, said first stabilizer bar having a first end and a second end; said first end of said first stabilizer bar for being connected to a first wheel assembly of a motor vehicle; a second stabilizer bar, said second stabilizer bar having a first end and a second end; said first end of said second stabilizer bar for being connected to a second wheel assembly of a motor vehicle; apparatus to hydraulically control said rotary actuator; a first hydraulic line connecting said rotary actuator to said control apparatus, said first hydraulic line having a first end and a second end; a second hydraulic line connecting said rotary actuator to said control apparatus, said second hydraulic line having a first end and a second end; a first connecting apparatus, connecting said second end of said first stabilizer bar to said rotary actuator; a second connecting apparatus, connecting said second end of said second stabilizer bar to said rotary actuator; said first connecting apparatus comprising: a first coupling member, said first coupling member having a first configuration; and first apparatus to receive said first coupling member, said first receiving apparatus being configured for solely accepting said first configuration of said first coupling member; said second connecting apparatus comprising: a second coupling member, said second coupling member having a second configuration; and second apparatus to receive said second coupling member, said second receiving apparatus being configured for solely accepting said second configuration of said second coupling member, to prevent incorrect insertion of said first coupling member into said second receiving apparatus, and to prevent incorrect insertion of said second coupling member into said first receiving apparatus; said method comprising the steps of:

connecting said first end of said first stabilizer bar to a first wheel assembly of a motor vehicle;

connecting said first end of said second stabilizer bar to a second wheel assembly of a motor vehicle;

connecting said rotary actuator to said control apparatus with said first hydraulic line;

connecting said rotary actuator to said control apparatus with said second hydraulic line;

connecting said second end of said first stabilizer bar to said rotary actuator by:

inserting said first coupling member having said first configuration into said first receiving apparatus; and solely accepting said first configuration of said first coupling member with said first receiving apparatus;

connecting said second end of said second stabilizer bar to said rotary actuator by:

inserting said second coupling member having said second configuration into said second receiving apparatus; and solely accepting said second configuration of said second coupling member with said second receiving apparatus and preventing incorrect insertion of said first coupling member into said second receiving apparatus and preventing incorrect insertion of said second coupling member into said first receiving apparatus.

2. The method according to claim 1 wherein said system further comprises: third connecting apparatus to connect said first end of said first hydraulic line to said rotary actuator, said third connecting apparatus having a third coupling member having a third configuration and a third apparatus to receive said third coupling member; and fourth connecting apparatus to connect said first end of said second hydraulic line to said rotary actuator, said fourth connecting apparatus having a fourth coupling member having a fourth configuration and a fourth apparatus to receive said fourth coupling member; said method further comprising the steps of:

connecting, with said third connecting apparatus, said first end of said first hydraulic line to said rotary actuator by:

inserting said third coupling member of said third connecting apparatus into said third receiving apparatus of said third connecting apparatus;

solely accepting said third configuration of said third coupling member with said third receiving apparatus;

connecting, with said fourth connecting apparatus, said first end of said second hydraulic line to said rotary actuator by:

inserting said fourth coupling member of said fourth connecting apparatus into said fourth receiving apparatus of said fourth connecting apparatus;

solely accepting said fourth configuration of said fourth coupling member with said fourth receiving apparatus and preventing incorrect insertion of said third coupling member into said fourth receiving apparatus and preventing incorrect insertion of said fourth coupling member into said third receiving apparatus.

3. The method according to claim 2 wherein said system further comprises: fifth connecting apparatus, connecting said second end of said first hydraulic line to said control apparatus; sixth connecting apparatus, connecting said second end of said second hydraulic line to said control apparatus; said fifth connecting apparatus comprising: a fifth coupling member having a fifth configuration; and fifth apparatus to receive said fifth coupling member; said sixth connecting apparatus comprising: a sixth coupling member having a sixth configuration; and sixth apparatus to receive said sixth coupling member, said method further comprising the steps of:

connecting, with said fifth connecting apparatus, said second end of said first hydraulic line to said control apparatus by:

inserting said fifth coupling member of said fifth connecting apparatus into said fifth receiving apparatus of said fifth connecting apparatus; and solely accepting said fifth configuration of said fifth coupling member of said fifth connecting apparatus with said fifth receiving apparatus of said fifth connecting apparatus;

connecting, with said sixth connecting apparatus, said second end of said second hydraulic line to said control apparatus by:

inserting said sixth coupling member of said sixth connecting apparatus into said sixth receiving apparatus of said sixth connecting apparatus; and solely accepting said sixth configuration of said sixth coupling member of said sixth connecting apparatus with said sixth receiving apparatus of said sixth connecting apparatus and preventing incorrect insertion of said fifth coupling member into said sixth receiving apparatus and preventing incorrect insertion of said sixth coupling member into said fifth receiving apparatus.

4. The method according to claim 3 wherein said first configuration of said first coupling member and said first receiving apparatus are configured to require a rotationally correct operational position of said first stabilizer bar with respect to said rotary actuator; and said second configuration of said second coupling member and said second receiving apparatus are configured to require a rotationally correct operational position of said second stabilizer bar with respect to said rotary actuator, and further wherein:

said step of connecting, with the first connecting apparatus, the second end of the first stabilizer bar to the rotary actuator further comprises connecting the first stabilizer bar to the rotary actuator in a rotationally correct operational position by utilizing the first configuration of the first coupling member and the first receiving apparatus; and said step of connecting, with the second connecting apparatus, the second end of the second stabilizer bar to the rotary actuator further comprises connecting the second stabilizer bar to the rotary actuator in a rotationally correct operational position by utilizing the second configuration of the second coupling member and the second receiving apparatus.

5. The method according to claim 4 wherein each of said third coupling member, said fourth coupling member, said fifth coupling member and said sixth coupling member have a diameter; each of said diameters of said third coupling member, said fourth coupling member, said fifth coupling member and said sixth coupling member being substantially different from one another; each of said third receiving apparatus, said fourth receiving apparatus, said fifth receiving apparatus and said sixth receiving apparatus comprising a coupling member having a diameter; each of said diameters of said coupling members of said third receiving apparatus, said fourth receiving apparatus, said fifth receiving apparatus and said sixth receiving apparatus being substantially different from one another; said diameter of said third coupling member being substantially the same as said diameter of said coupling member of said third receiving apparatus; said diameter of said fourth coupling member being substantially the same as said diameter of said coupling member of said fourth receiving apparatus; said diameter of said fifth coupling member being substantially the same as said diameter of said coupling member of said fifth receiving apparatus; and said diameter of said sixth coupling member being substantially the same as said diameter of said coupling member of said sixth receiving apparatus, and further wherein:

said step of connecting, with the third connecting apparatus, the first end of the first hydraulic line to the rotary actuator further comprises:

inserting the third coupling member having the diameter into the third receiving apparatus having the coupling member with the diameter substantially the same as the diameter of the third coupling member; and solely accepting the diameter of the third coupling member with the coupling member of the third receiving apparatus; said step of connecting, with the fourth connecting apparatus, the first end of the second hydraulic line to the rotary actuator further comprises:

inserting the fourth coupling member having the diameter into the fourth receiving apparatus having the coupling member with the diameter substantially the same as the diameter of the fourth coupling member; and solely accepting the diameter of the fourth coupling member with the coupling member of the fourth receiving apparatus and preventing incorrect insertion of the third coupling member into the coupling member of the fourth receiving apparatus and preventing incorrect insertion of the fourth coupling member into the coupling member of the third receiving apparatus;

said step of connecting, with the fifth connecting apparatus, the second end of the first hydraulic line to the control apparatus further comprises:

inserting the fifth coupling member having the diameter into the fifth receiving apparatus having the coupling member with the diameter substantially the same as the diameter of the fifth coupling member; and solely accepting the diameter of the fifth coupling member with the coupling member of the fifth receiving apparatus;

said step of connecting, with the sixth connecting apparatus, the second end of the second hydraulic line to the control apparatus further comprises:

inserting the sixth coupling member having the diameter into the sixth receiving apparatus having coupling member with the diameter substantially the same as the diameter of the sixth coupling member; and solely accepting the diameter of the sixth coupling member with the coupling member of the sixth receiving apparatus and preventing incorrect insertion of the fifth coupling member into the coupling member of the sixth receiving apparatus and preventing incorrect insertion of the sixth coupling member into the coupling member of the fifth receiving apparatus.

6. The method according to claim 5 wherein said first receiving apparatus and said second receiving apparatus each comprise a circular member having an outer circumference and an inner circumference disposed within said outer circumference; each of said circular members comprising a plurality of recesses extending from said inner circumference towards said outer circumference; said first configuration and said second configuration each being circular and having a circumference; each of said first configuration and said second configuration comprising a plurality of splines extending outwardly from said circumference of said first configuration and said second configuration; said plurality of splines of said first configuration being configured and disposed for solely engaging with said plurality of recesses of said circular member of said first receiving apparatus; said plurality of splines of said second configuration being configured and disposed for solely engaging with said plurality of recesses of said circular member of said second receiving apparatus; and said plurality of splines and said plurality of recesses being disposed to require a correct positioning of both of said first stabilizer bar and said second stabilizer bar with respect to said rotary actuator and further wherein:

said step of connecting, with the first connecting apparatus, the second end of the first stabilizer bar to the rotary actuator further comprises:

inserting the plurality of splines of the first coupling member into the plurality of recesses of the first receiving apparatus; and solely accepting the plurality of splines of the first coupling member with the plurality of recesses of the first receiving apparatus;

said step of connecting, with the second connecting apparatus, the second end of the second stabilizer bar to the rotary actuator further comprises:

inserting the plurality of splines of the second coupling member into the plurality of recesses of the second receiving apparatus; and solely accepting the plurality of splines of the second coupling member with the plurality of recesses of the second receiving apparatus and preventing incorrect insertion of the plurality of splines of the first coupling member into the plurality of recesses of the second receiving apparatus and preventing incorrect insertion of the plurality of splines of the second coupling member into the plurality of recesses of the first receiving apparatus.

7. The method according to claim 5 wherein said first receiving apparatus and said second receiving apparatus each comprise a circular member having an orifice disposed therein, said orifice having a polygonal shape; each of said first configuration and said second configuration comprise a projection having a polygonal shape; said polygonal shape of said first configuration matching said polygonal shape of said orifice of said circular member of said first receiving apparatus, said polygonal shape of said first configuration being different from said polygonal shape of said second configuration; said polygonal shape of said second configuration matching said polygonal shape of said orifice of said circular member of said second receiving apparatus; and said polygonal shapes of said first and second configurations being configured to require a correct positioning of both of said first stabilizer bar and said second stabilizer bar with respect to said rotary actuator, and further wherein:

said step of connecting, with the first connecting apparatus, the second end of the first stabilizer bar to the rotary actuator further comprises:

inserting the projection having the polygonal shape of the first coupling member into the matching polygonal orifice of the first receiving apparatus; and solely accepting the polygonal projection of the first coupling member with the matching polygonal orifice of the first receiving apparatus;

said step of connecting, with the second connecting apparatus, the second end of the second stabilizer bar to the rotary actuator further comprises:

inserting the projection having the polygonal shape of the second coupling member into the matching polygonal orifice of the second receiving apparatus; and solely accepting the polygonal projection of the second coupling member with the matching polygonal orifice of the second receiving apparatus and preventing incorrect insertion of the polygonal projection of the first coupling member into the polygonal orifice of the second receiving apparatus and preventing incorrect insertion of the polygonal projection of the second coupling member into the polygonal orifice of the first receiving apparatus.

8. The method according to claim 5 wherein: said first receiving apparatus and said second receiving apparatus each comprise a circular member having a center point and a circumference extending around said center point; each of said circular members comprising a plurality of holes disposed between said center point and said circumference; said plurality of holes being distributed asymmetrically about said center points of each of said circular members; each of said first configuration and said second configuration being circular and having a center point and a circumference extending about said center point; each of said first configuration and said second configuration comprising a surface and a plurality of projections extending outwardly from said surface; said plurality of projections of said first configuration being distributed asymmetrically about said center point of said first configuration; said plurality of projections of said second configuration being distributed asymmetrically about said center point of said second configuration; each of said plurality of projections of said first configuration being disposed in a position corresponding to one of said plurality of holes of said circular member of said first receiving apparatus; each of said plurality of projections of said second configuration being disposed in a position corresponding to one of said plurality of holes of said circular member of said second receiving apparatus, said positions of said plurality of projections of said second configuration being different from said positions of said plurality of projections of said first configuration; and said plurality of projections and said plurality of holes being disposed to require a correct positioning of both of said first stabilizer bar and said second stabilizer bar with respect to said rotary actuator, and further wherein:

said step of connecting, with the first connecting apparatus, the second end of the first stabilizer bar to the rotary actuator further comprises:

inserting the plurality of asymmetrically disposed projections of the first coupling member into the plurality of holes of the first receiving apparatus; and solely accepting the plurality of projections of the first coupling member with the plurality of holes of the first receiving apparatus;

said step of connecting, with the second connecting apparatus, the second end of the second stabilizer bar to the rotary actuator further comprises:

inserting a plurality the asymmetrically disposed projections of the second coupling member into the plurality of holes of the second receiving apparatus; and solely accepting the plurality of projections of the second coupling member with the plurality of holes of the second receiving apparatus and preventing incorrect insertion of the plurality of projections of the first coupling member into the plurality of holes of the second receiving apparatus and preventing incorrect insertion of the plurality of projections of the second coupling member into the plurality of holes of the first receiving apparatus.

* * * * *

UNITED STATES PATENT AND TRADEMARK OFFICE
CERTIFICATE OF CORRECTION

PATENT NO. : 5,826,687
DATED : October 27, 1998
INVENTOR(S) : Jörg BUNGELER, Manfred BERWIND, Thomas GÖPPNER,
Thomas JOHN, Horst OPPITZ, Bernhard SCHMITT, and
Ultivh WALZ It is certified that error appears in the above-identified patent and that said Letters Patent is hereby corrected as shown below:

In column 1, line 32, after 'in', delete "spits" and insert --spite--.

In column 4, line 65, after 'FIG.', delete "3c and 3d," and insert --3d shows--.

In column 5, line 45, after 'and', delete "3e'" and insert --3g--.

In column 5, line 58, after 'profiles', delete "1", " and insert --17",--.

Signed and Sealed this

Twenty-seventh Day of July, 1999

Attest:

Q. TODD DICKINSON

*Attesting Officer*    *Acting Commissioner of Patents and Trademarks*